United States Patent
Shoji (10) Patent No.: US 12,032,899 B1
(45) Date of Patent: Jul. 9, 2024

(54) REVISION CONTENT SUMMARIZING APPARATUS, IMAGE FORMING SYSTEM, AND REVISION CONTENT SUMMARIZING METHOD

(71) Applicant: KYOCERA Document Solutions Inc., Osaka (JP)

(72) Inventor: Hidenori Shoji, Concord, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/331,936

(22) Filed: Jun. 9, 2023

(51) Int. Cl.
    *G06F 40/169* (2020.01)
    *G06F 40/103* (2020.01)
    *G06F 40/166* (2020.01)
(52) U.S. Cl.
    CPC .......... *G06F 40/166* (2020.01); *G06F 40/103* (2020.01)
(58) Field of Classification Search
    CPC ........................ G06F 40/166; G06F 40/103
    See application file for complete search history.

(56) References Cited

U.S. PATENT DOCUMENTS

| | | | | |
|---|---|---|---|---|
| 6,016,492 | A * | 1/2000 | Saxton | G06F 40/103 |
| 2014/0215302 | A1 * | 7/2014 | Little | G06F 40/166 |
| | | | | 715/256 |
| 2015/0095755 | A1 * | 4/2015 | Bonk | G06F 40/194 |
| | | | | 715/229 |
| 2016/0378734 | A1 * | 12/2016 | Mullins | G06F 3/04855 |
| | | | | 715/229 |
| 2020/0334326 | A1 * | 10/2020 | Zhang | G06F 40/197 |
| 2023/0186017 | A1 * | 6/2023 | Peleg | G06F 40/211 |
| | | | | 715/271 |
| 2023/0351099 | A1 * | 11/2023 | Roy | G06F 16/345 |

FOREIGN PATENT DOCUMENTS

| | | | | |
|---|---|---|---|---|
| CN | 116888661 A | * | 10/2023 | ............. G06F 3/167 |
| JP | H11120049 A | * | 10/1997 | ............. G06F 12/00 |
| JP | 2020-057277 A | | 4/2020 | |

* cited by examiner

*Primary Examiner* — Hassan Mrabi
(74) *Attorney, Agent, or Firm* — Hawaii Patent Services; Nathaniel K. Fedde; Kenton N. Fedde (57) ABSTRACT

Provided is a revision content summarizing apparatus that can summarize revision content without knowing the chapter structure (composition). A document revision acquisition unit acquires pre-revision document data, post-revision document data, and detailed information having format of revision part. A relationship acquisition unit acquires relationship information between a reviewee, who is a user making the revision, and a reviewer, who is a user reviewing the revised content. A summary generation unit generates summary data from the post-revision document data, the pre-revision document data, and the detailed information acquired by the document revision acquisition unit with the relationship information acquired by the relationship acquisition unit. The summary generation unit determines the number of summary characters from the relationship distance between the reviewee and the reviewer in the relationship information.

15 Claims, 8 Drawing Sheets

REVISION CONTENT SUMMARIZING APPARATUS, IMAGE FORMING SYSTEM, AND REVISION CONTENT SUMMARIZING METHOD

BACKGROUND

The present disclosure relates to a revision content summarizing apparatus, an image forming system, and a revision content summarizing method, especially when revising document data.

There exists an image forming apparatus such as a multifunctional peripheral (MFP) that can print documents and images, or the like.

There also exists an image forming system that includes the image forming apparatus and stores, outputs, modifies, and summarizes documents. Such an image forming system may use dedicated application software for reviewing by a reviewer, which highlights or strike-out lines through change parts in document data. However, such highlight and strike-out line indicating method is cumbersome because the reviewer must look at the document data while checking the revisions.

As regarding such technical issues, a typical business management apparatus is disclosed. This business management apparatus (server) analyzes the revision parts of a deliverable created by a worker, generates summary comments of the revised contents at the revision parts, and provides the summary comments of the revised contents to a business manager.

This business management apparatus checks and summarizes the revised contents for each chapter and section.

On the other hand, there is a technology to generate a summary of a document by so-called AI (Artificial Intelligence) of natural language processing.

SUMMARY

A revision content summary apparatus according to the present disclosure is a revision content summarizing apparatus includes: a document revision acquisition unit that acquires pre-revision document data, post-revision document data, and detailed information having format of revision part; a relationship acquisition unit that acquires relationship information, which is information indicating a relationship between a reviewee, who is a user making the revision, and a reviewer, who is a user reviewing the revised content; and a summary generation unit that generates summary data from the post-revision document data, the pre-revision document data, and the detailed information acquired by the document revision acquisition unit with the relationship information acquired by the relationship acquisition unit; and wherein the summary generation unit determines number of summary characters of the summary data from the relationship distance between the reviewee and the reviewer that is calculated based on the relationship information.

An image forming system according to the present disclosure is an image forming system includes: a document revision acquisition unit that acquires pre-revision document data, post-revision document data, and detailed information having format of revision part; a relationship acquisition unit that acquires relationship information, which is information indicating a relationship between a reviewee, who is a user making the revision, and a reviewer, who is a user reviewing the revised content; and a summary generation unit that generates summary data from the post-revision document data, the pre-revision document data, and the detailed information acquired by the document revision acquisition unit with the relationship information acquired by the relationship acquisition unit; and wherein the summary generation unit determines number of summary characters of the summary data from the relationship distance between the reviewee and the reviewer that is calculated based on the relationship information.

A revision content summary method according to the present disclosure is a revision content summarizing method including the steps of: acquiring pre-revision document data, post-revision document data, and detailed information having format of revision part; acquiring relationship information, which is information indicating a relationship between a reviewee, who is a user making the revision, and a reviewer, who is a user reviewing the revised content; and generating summary data from the acquired post-revision document data, the pre-revision document data, and the acquired detailed information with the relationship information; and wherein determining number of summary characters of the summary data from the relationship distance between the reviewee and the reviewer that is calculated based on the relationship information.

DETAILED DESCRIPTION

Embodiment

[System Configuration of Image Formation System X]

Figure 1:
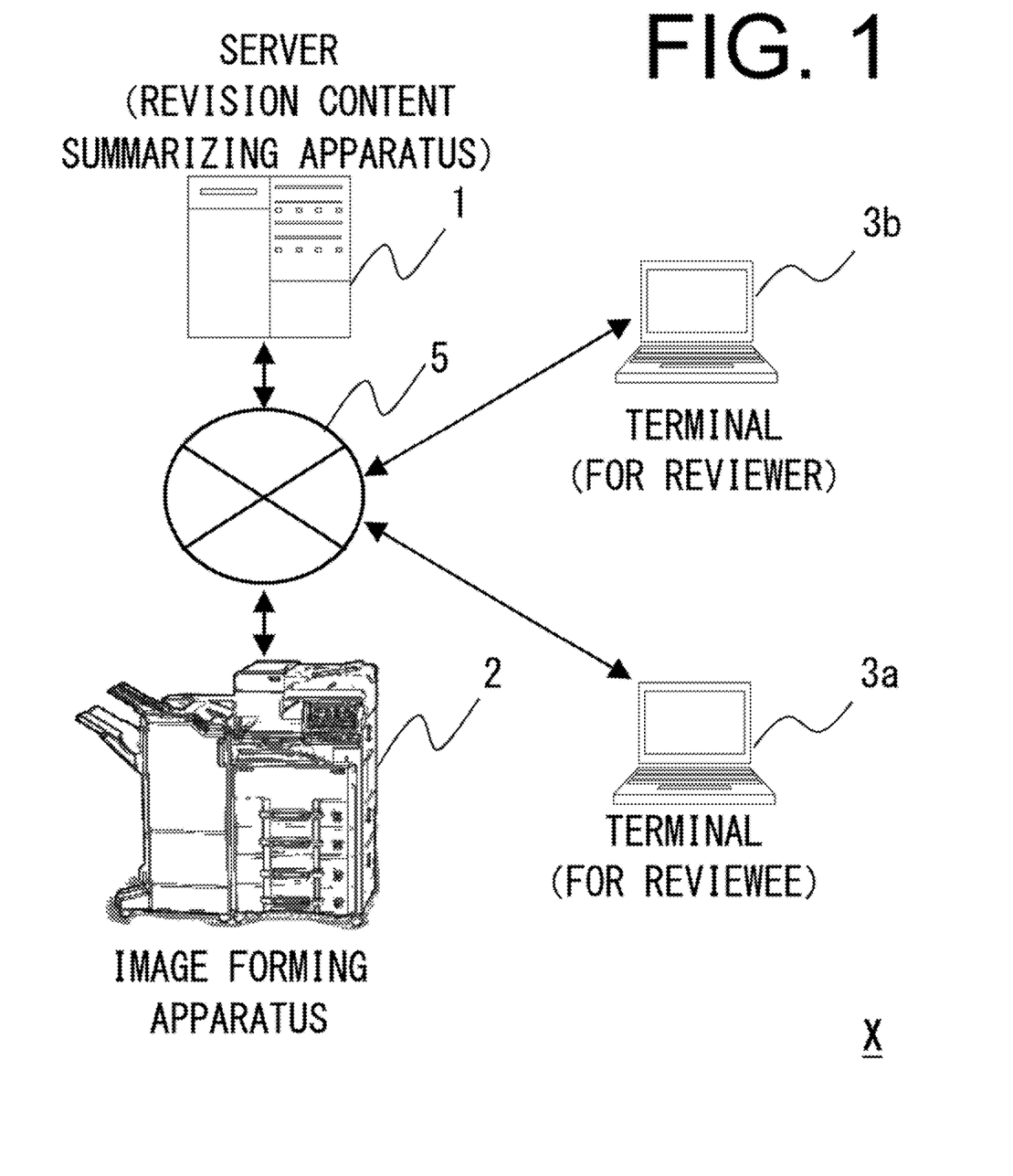
FIG. 1 is a system configuration figure of an image forming system according to an embodiment of the present disclosure.

Firstly, with reference to FIG. 1, a system configuration of an image forming system X is described.

The image forming system X is provided with a server 1, an image forming apparatus 2, and terminals 3a and 3b, and each of the apparatuses is connected by a network 5.

The server 1 is an example of a revision content summarizing apparatus that accumulates document data before and after revision and summarizes the revision content. The server 1 may be, for example, a server for pull-printing that controls the image forming apparatus 2, a server for DMS (Document Management System), a server for document management and processing to store and output documents, or the like. Specifically, the server 1 may be a PC (Personal Computer) server, a dedicated machine, a general-purpose machine, a PC installed a dedicated application for the image forming apparatus 2, a smartphone, a NAS (Network-Attached Storage), a high-performance image forming apparatus, or the like.

The image forming apparatus 2 is a document reading apparatus such as an MFP, a network scanner, a document scanner, a network facsimile machine, a printer with scanner function, or the like. The image forming apparatus 2 may execute an application software (hereinafter simply referred to as an "application") for connecting to the server 1. In the present embodiment, the image forming apparatus 2 may be provided with a function to read (scan) a set of documents and an image forming function to print or convert documents into electronic documents. In addition, the image forming apparatus 2 may be connected to the server 1 by the intranet of network 5 or USB (Universal Serial Bus).

The terminals 3a and 3b are PCs, smartphones, cell phones, tablet terminals, dedicated terminals, PDAs (Personal Digital Assistants), or the like. In the present embodiment, the terminal 3a is a terminal for the reviewee, who is a user making revision of the document. On the other hand, the terminal 3b is a terminal for the reviewer, who is a user reviewing the revision contents.

Here, the terminals 3a and 3b can install and execute various applications including a web browser for accessing to the server 1, a device driver for image forming system X, other dedicated applications for review, or the like. This allows the reviewee and the reviewer using terminals 3a and 3b to access to server 1 or receive push notifications, review or modify documents by using UI (User Interface), and the like.

In the present embodiment, as the UI, application of an SMS (Short Message Service), an SNS (Social Networking Service), a messenger, other type of chat, or the like (hereinafter simply referred to as a "chat" or a "chat format"), an interface of the application, an interface that imitates such the application, or the like, can be used.

The network 5 is, for example, LAN (Local Area Network), wireless LAN, WAN (Wide Area Network), cellular phone network, voice phone network, or the like.

Figure 2:
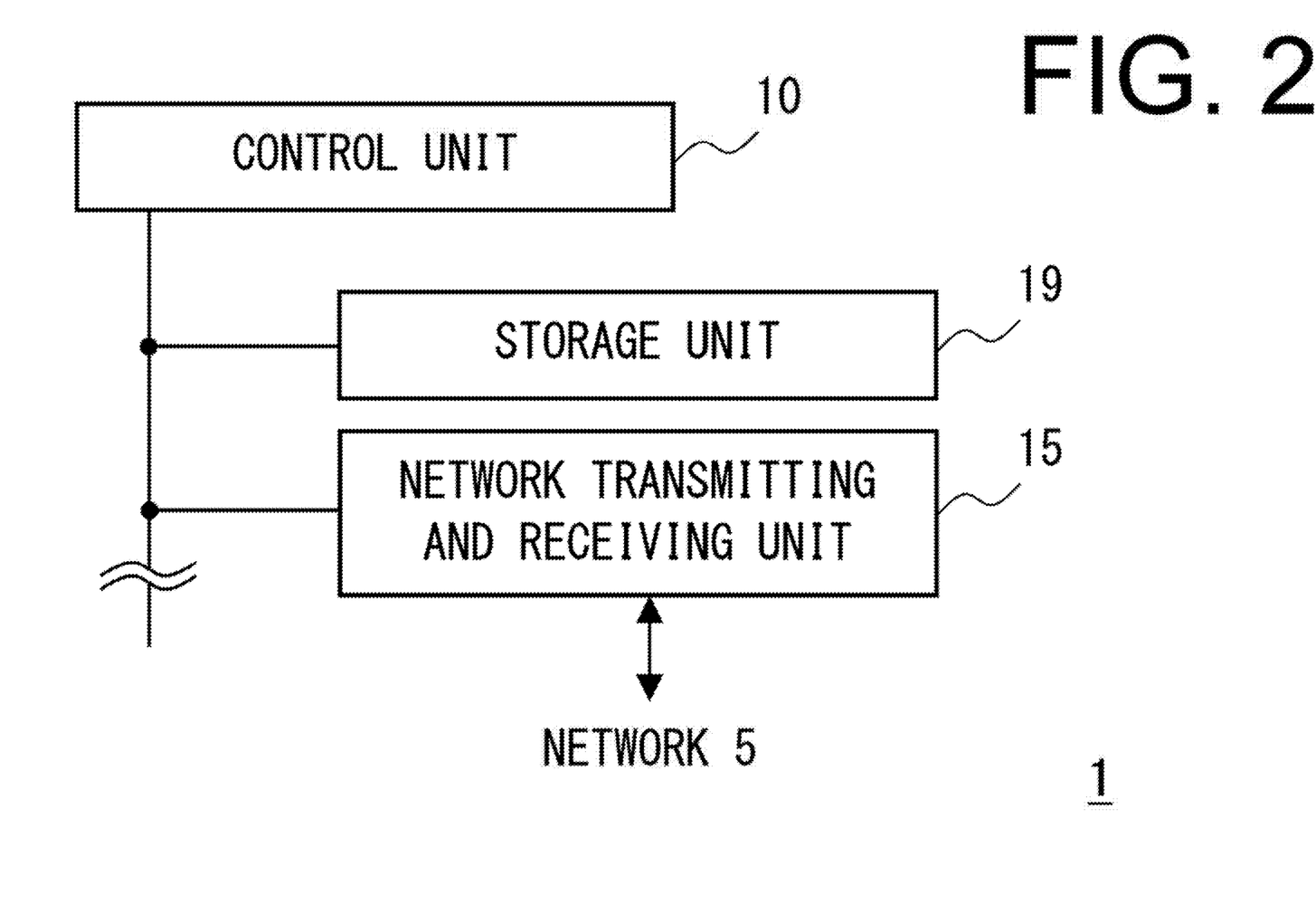
FIG. 2 is a block diagram showing a control configuration of the server as shown in FIG. 1.

Next, with referring FIG. 2, a control configuration of server 1 is described.

The server 1 includes a control unit 10, a network transmitting and receiving unit 15, and a storage unit 19.

The control unit 10 is an information processing unit such as a CPU (Central Processing Unit), a MPU (Micro Processing Unit), a GPU (Graphics Processing Unit), a TPU (Tensor Processing Unit), a DSP (Digital Signal Processor), an ASIC (Application Specific Integrated Circuit, application specific processor), or the like.

The control unit 10 is made to operate as each of the functional blocks as described later by reading a control program stored in the ROM or HDD of the storage unit 19, expanding this control program into RAM, and executing it. The control unit 10 also controls the entire apparatus according to the instruction information input from the terminals 3a and 3b and the operation panel unit of the image forming apparatus 2.

In the present embodiment, the control unit 10 may also be provided with an AI (Artificial Intelligence) accelerator function to perform the analysis process. Specifically, the control unit 10 may provide, for example, a GPU, a TPU, or the like, as an accelerator for a product-sum operation of a neural network for so-called deep learning. Therefore, the control unit 10 can use a learned model or perform model learning. In the present implementation, various models related to natural language processing, image processing including OCR (Optical Character Recognition), or the like, can be used. Among these, as for natural language processing, an encoder-decoder model, or the like, as described later, can be used. As for OCR, it is possible to execute character recognition by a convolutional neural network, or the like, acquire characters and character positions on image data, and extract keywords. As for an image, it is also possible to use models that recognize non-text lines, symbols, illustrations, logos, photographs, and the like. For a photograph, it is also possible to use a model that recognizes captured objects such as people, animals, objects, and the like.

Furthermore, the control unit 10 can also convert the data of the document before and after revision into an electronic document such as PDF, and the like, or an image data file such as TIFF, and the like.

The network transmitting and receiving unit 15 is a network connection unit that includes a LAN board and wireless transmitting and receiving unit, and the like, for connecting to the network 5.

The network transmitting and receiving unit 15 transmits and receives data on the data communication line and voice signals on the voice telephone line.

The storage unit 19 is a storage by using a non-transitory recording medium. The storage unit 19 includes a semiconductor memory such as ROM (Read Only Memory) and RAM (Random Access Memory), a magnetic storage media such as HDD (Hard Disk Drive), an optical recording medium, or the like. The ROM and HDD of storage unit 19 store a control program for controlling the operation of the server 1. The control program includes an operating system (OS) and application software (Hereinafter simply referred to as "application"). Moreover, memory 19 also stores the user's account settings. The memory 19 may also store document boxes (storage folders, shared folders) for each user, applications that can be executed on the server 1, information about performance and functions, and the like.

In addition, in the server 1, the control unit 10 may be integrally formed, such as a CPU with a built-in GPU, a chip-on-module package, a SOC (System On a Chip), or the like.

The control unit 10 may also have built-in RAM, ROM, flash memory, or the like.

[Functional Configuration of Server 1]

Figure 3:
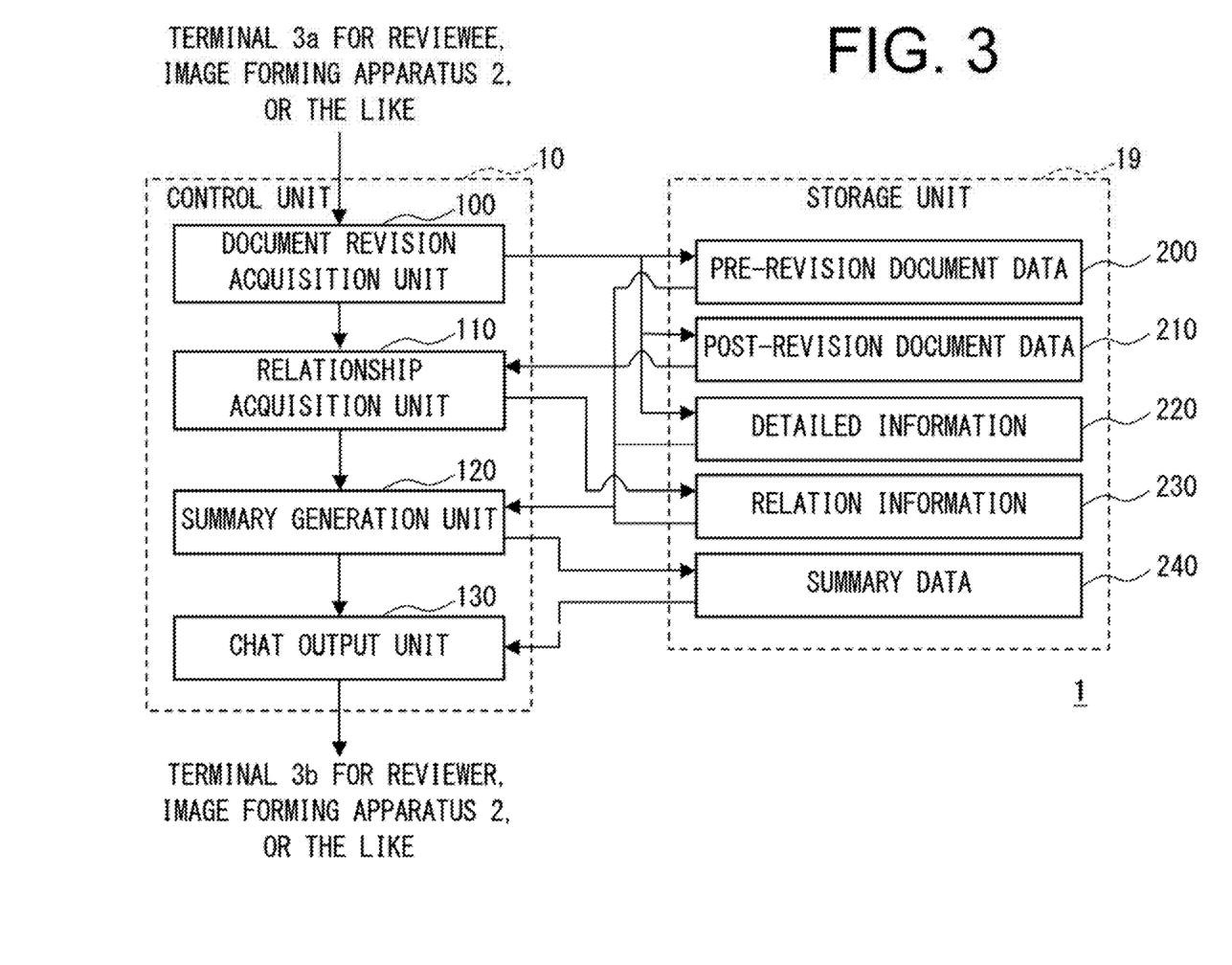
FIG. 3 is a block diagram showing a functional configuration of the server according to an embodiment of the present disclosure.
Figure 4:
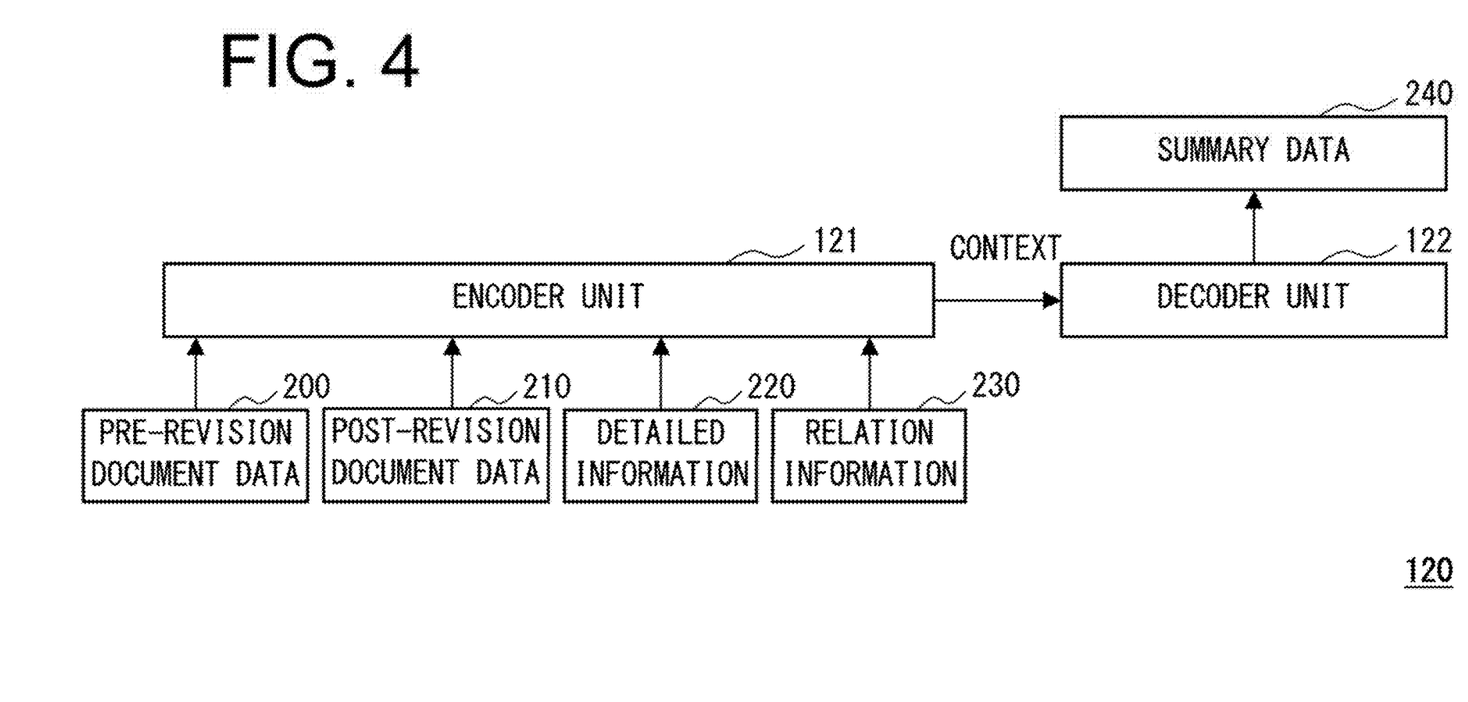
FIG. 4 is a block diagram showing a configuration of the AI of the summary generation unit as shown in FIG. 3.

Here, with referring to FIGS. 3 to 4, a functional configuration of server 1 is described.

The control unit 10 of server 1 is provided with a document revision acquisition unit 100, a relationship acquisition unit 110, a summary generation unit 120, and a chat output unit 130.

The storage unit 19 stores a pre-revision document data 200, a post-revision document data 210, a detailed information 220, a relation information 230, and a summary data 240.

The document revision acquisition unit 100 acquires the pre-revision document data 200, the post-revision document data 210, and the detailed information 220 including a format of the revision part. The document revision acquisition part 100 can acquire these data from the reviewee's terminal 3a or the image forming apparatus 2, or the like. The document revision acquisition unit 100 can also function as a parser or pre-processing unit that parameterizes these data.

The relationship acquisition unit 110 acquires relationship information 230 indicating the relationship between the reviewee and the reviewer. The relationship acquiring unit 110 may, for example, acquire the relationship information 230 from the pre-revision document data 200 and the post-revision document data 210, or it may acquire the relationship information 230 based on each user's account settings, or the other data. Further, the relationship acquisition unit 110 can calculate a relationship distance based on the relationship information 230.

The summary generation unit 120 generates summary data 240 from the pre-revision document data 200, the post-revision document data 210, and the detailed information 220 acquired by the document revision acquisition unit 100, and the relationship information 230 acquired from the relationship acquisition unit 110.

In the present embodiment, the summary generation unit 120 can generate the summary data 240 by an encoder-decoder model with character string information. In this case, the summary generation unit 120 may generate the summary data 240 by using the AI accelerator of the control unit 10.

Further, the summary generation unit 120 calculates the number of summary characters by the relationship distance between the reviewee and the reviewer based on the relationship information 230, and it generates appropriate summary data 240 for each reviewer. Specifically, the summary generation unit 120 may increase the number of summary characters if the relationship distance is larger than if the relationship distance is smaller.

Further, the summary generation unit 120 can change the determination content of the number of summary characters based on revisions of the summary data 240 by the user.

The chat output unit 130 outputs the summary data 240 to the reviewer in a chat format. Specifically, the chat output unit 130 can pop up the summary data 240 to the reviewer's terminal 3b via chat during the review. In this case, the chat output unit 130 may send the summary data 240 to the reviewer by using a chatbot.

The pre-revision document data 200 may be an application file of a word processor, spreadsheet, presentation, or the like. Alternatively, the pre-revision document data 200 may be electronic document data such as PDF (Portable Document Format), or the like. Alternatively, the pre-revision document data 200 may be image data including raster data or bitmap data such as BMP, TIFF, jpg, and the like, or vector data such as PS, and the like. This image data may or may not be compressed. The pre-revision document data 200 may be created by the reviewee by using the terminal 3a, or by scanned and generated by the image forming apparatus 2, or the like. If the pre-revision document data 200 includes only the images, it is suitable that the character data is obtained by OCR, or the like.

The post-revision document data 210 is the data in which the pre-revision document data 200 has been reviewed and modified by the reviewee. The post-revision document data 210 may be data in the same format as the pre-revision document data 200, or it may be data that has been converted to other formats. This converted data includes paper documents that have been handwritten, marked, or the like, and scanned by the image forming apparatus 2. In such cases, the character data may be obtained by OCR, or the like, so that the part before and after the revision can be compared.

The detailed information 220 includes the character and image data at the time of revision, the format of the revision part such as text, table, figure, or the like, and the revision information of the revision part such as addition, deletion, change, or the like. Among these, the revision information may be set in a specific format for the text information of the revision part. The detailed information 220 may be extracted by comparing the pre-revision document data 200 with the post-revision document data 210.

The relationship information 230 is information indicating the relationship between the reviewee and the reviewer. The relationship information 230 includes user information of the reviewee and the reviewer. The user information may include personnel information having the belonging department, group, position, or the like, to which the reviewee and the reviewer belong. In addition, the relationship information 230 may include information on the document access distance of the reviewee and the reviewer. This document access distance information may be information calculated from the frequency of reviewers' reviews, the number and frequency of accesses to the same document data, the degree of commonality (vector) between documents in the created document data, or the like. Furthermore, the relationship information 230 may include a value of the relationship distance. This relationship distance may be calculated from the distance between the reviewee's knowledge and the reviewer's knowledge, calculated from the user information or document access distance information.

The summary data 240 is data that includes text, and the like, which can be output via chat. The summary data 240 may be, for example, character string information of tens to thousands of characters, data in HTML (Hyper Text Markup Language), XML (Extensible Markup Language), JSON (JavaScript Object Notification) format, or the like. The summary data 240 may be able to express tags that modify characters, link tags, pictograms, or the like, in chat.

Next, with referring to FIG. 4, details of an example configuration of the summary generation unit 120 is explained.

The summary generator 120 can be configured using any algorithm such as AI, statistical model, or the like, without any particular limitation.

In the present example, as the summary generation unit 120, an example of an encoder-decoder model by using character string information is explained. As the encoder-decoder model, for example, a model such as LSTM, transformer, or the like, can be used. Further, as the summary generation unit 120, it is also possible to use a model customized by fine-tuning, or the like, of a large-scale model for natural language processing including GPT-3, GPT-4, and the like.

FIG. 4 shows an example of a summary generation unit 120 that includes an encoder unit 121 and a decoder unit 122, applying this encoder-decoder model.

In this example, as input information, the character string information of the pre-revision document data 200, the character string information of the post-revision document data 210, the format of the revision part as detailed information 220, the revision information, and the user information and the relationship distance of the reviewee and the reviewer in the relationship information 230 are input in the encoder unit 121.

The context output by encoder unit 121 is input to decoder unit 122 and output as summary data 240.

Here, the control unit 10 of server 1 is made to function as the document revision acquisition unit 100, the relationship acquisition unit 110, the summary generation unit 120, and the chat output unit 130, mainly by executing the control program stored in the storage unit 19.

The units of server 1 as described above are hardware resources that execute the revision content summarizing method according to the present disclosure.

In addition, some or any combination of the functional configurations as described above may be configured hardware or circuitry with ICs, programmable logic, FPGA (Field-Programmable Gate Array), or the like.

[Revision Content Summarization Process by Server 1]

Figure 5:
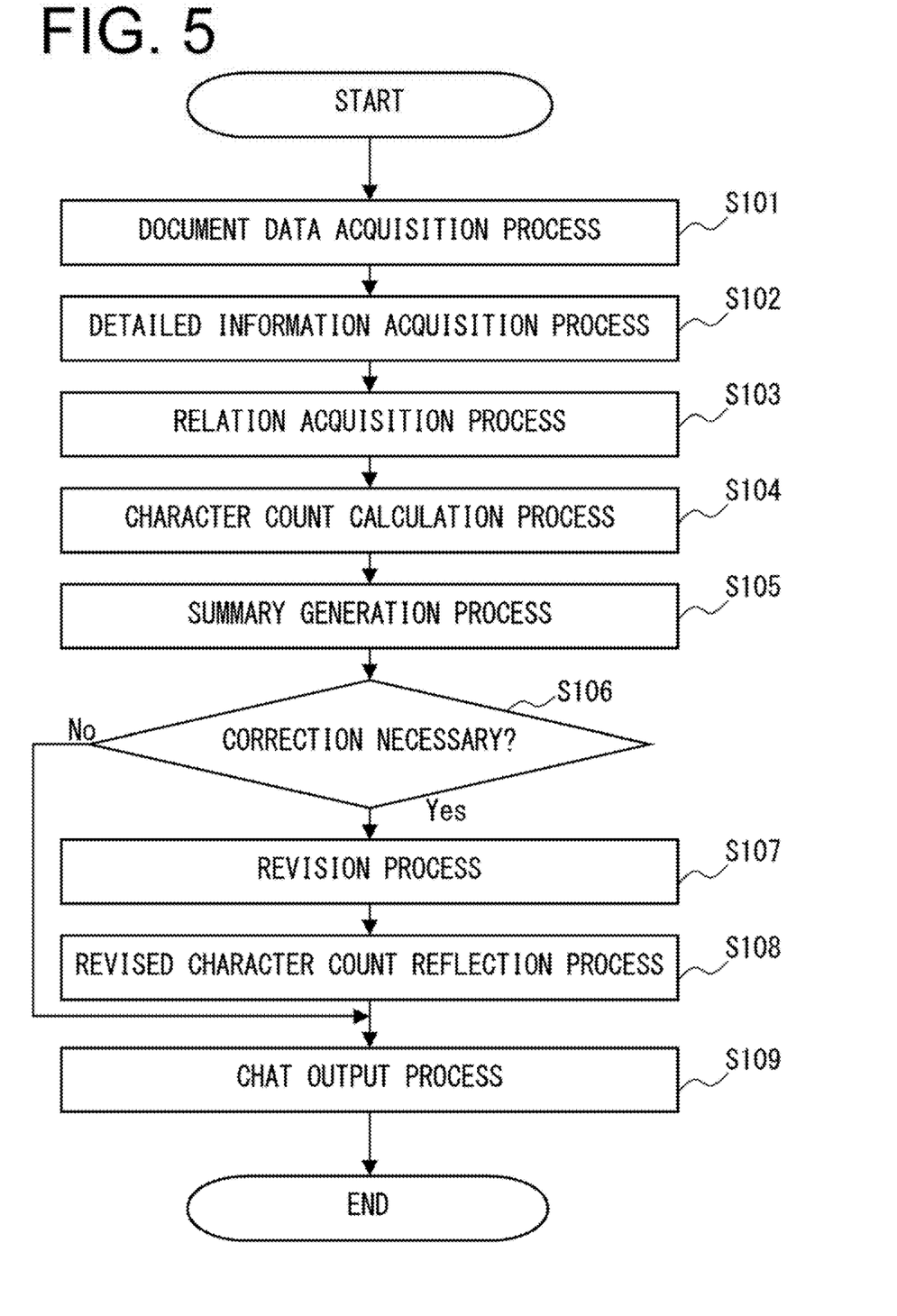
FIG. 5 is a flowchart of the revision content summarization process according to the embodiment of the present disclosure.
Figure 6:
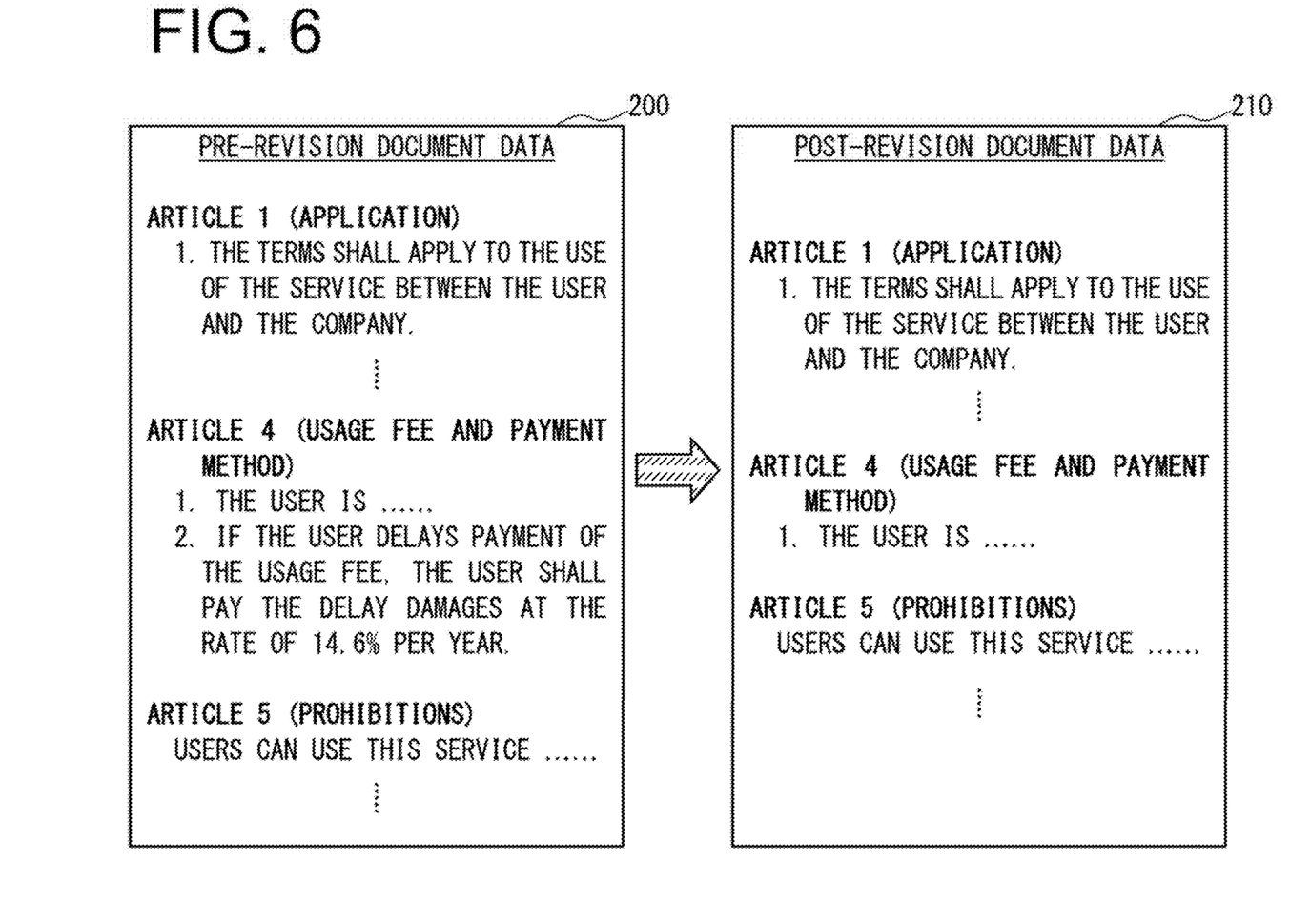
FIG. 6 is a conceptual diagram showing examples of each document data to be obtained in the revision content summary process as shown in FIG. 5.
Figure 7:
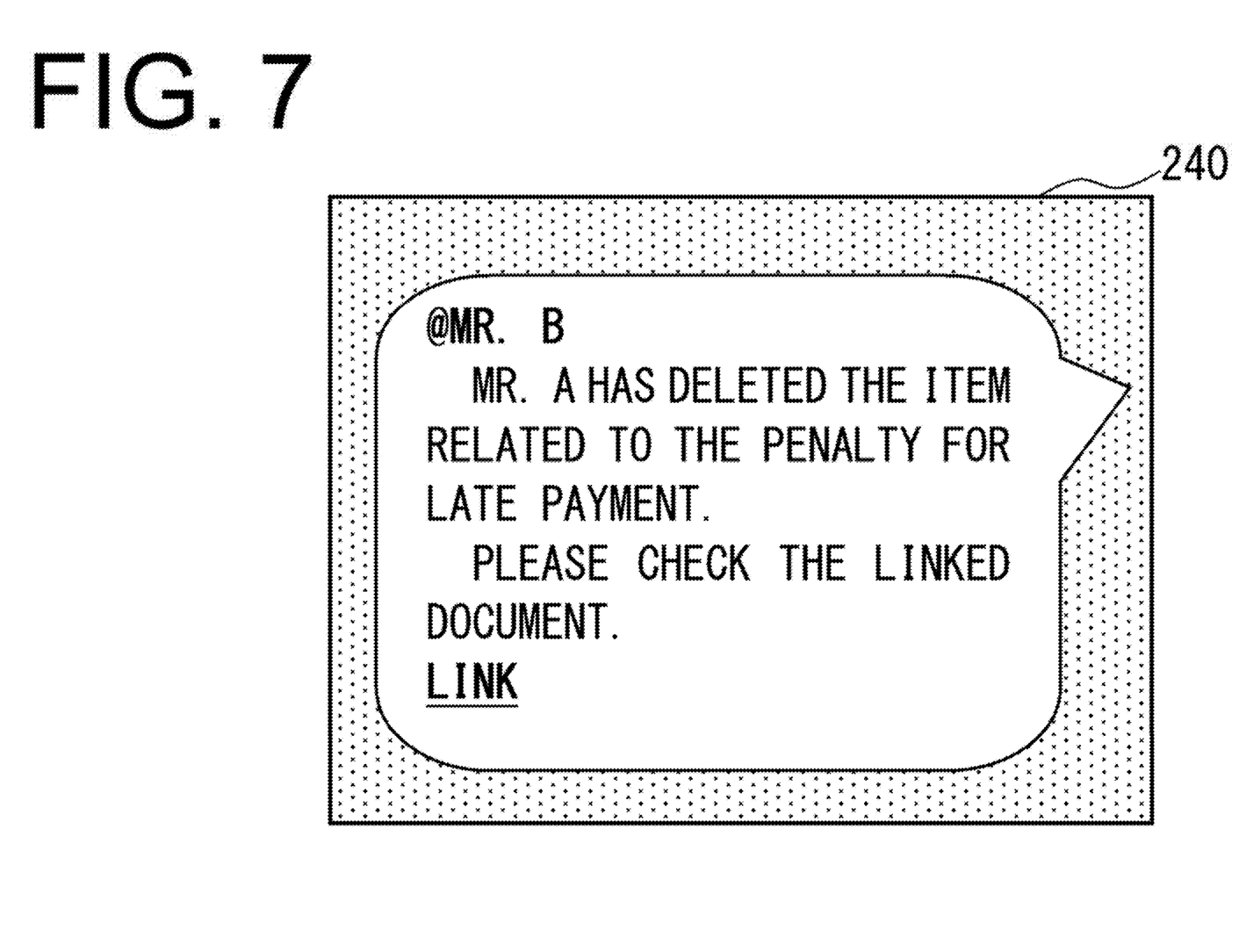
FIG. 7 is a conceptual diagram showing an example of chat output of summary data generated by the summary generation process as shown in FIG. 5.

Next, with reference to FIGS. 5 to 7, an explanation of the revision content summarization process by the server 1 in accordance with the embodiment of the disclosure is described.

In the revision content summarization process according to the present embodiment, firstly, the pre-revision document data 200 and the post-revision document data 210 are acquired. The detailed information 220 including the format of the revision parts is acquired from these. Then, the relationship information 230 between the reviewee and the reviewer is acquired. Then, summary data 240 is generated from the acquired data. At this time, the number of summary characters of the summary data 240 is calculated from the distance between the reviewee and the reviewer in the relationship information 230.

The revision content summary process according to the present embodiment is mainly executed by the control unit 10, in cooperation with each part, by using hardware resources to execute the program stored in the storage unit 19.

In the following, with reference to the flowchart in FIG. 5, the details of the revision content summary process are explained step by step.

(Step S101)

Firstly, the document revision acquisition unit 100 performs a document data acquisition process.

Here, the reviewee logs into server 1 from terminal 3a or image forming apparatus 2 by using a web browser or a dedicated application, and he or she selects document review via the UI. The reviewee then specifies the pre-revision document data 200 and the post-revision document data 210 and selects a reviewer.

Thus, the document revision acquisition unit 100 acquires the pre-revision document data 200 and the post-revision document data 210.

At this time, the document revision acquisition unit 100 may acquire the pre-revision document data 200 and the post-revision document data 210 by uploading from the terminal 3a.

Alternatively, the document revision acquisition unit 100 may acquire the scanned image data, facsimile received image data, data in the document box, or the like, in the image forming apparatus 2 as the pre-revision document data 200 and the post-revision document data 210.

(Step S102)

Next, the document revision acquisition unit 100 performs a detailed information acquisition process.

The document revision acquisition unit 100 acquires the detailed information 220 including the format of the revision part.

In this process, the document revision acquisition unit 100 parameterizes the revision part by the difference between the pre-revision document data 200 and the post-revision document data 210. The document revision acquisition unit 100 acquires this parameterized data as the detailed information 220. More specifically, the document revision acquisition unit 100 acquires as detailed information 220 the data including the format of the revision part of the pre-revision document data 200 and post-revision document data 210 and the revision information.

With reference to FIG. 6, an example of acquisition of the detailed information 220 is described.

FIG. 6 shows an example in which the reviewee has modified the pre-revision document data 200, which is a contract, and created the post-revision document data 210.

By using these, the document revision acquisition unit 100 generates character string information for input to the encoder unit 121 of the summary generation unit 120.

Firstly, the document revision acquisition unit 100 parameterizes the pre-revision document data 200 by unifying the character types, breaking it down into tokens, or the like, to generate character string information. In the example in FIG. 6, this character string information may be in a form of a character string such as "[Article, 1, (,Application,) 1., The, Terms, shall, apply, to, Company.]". In other words, it is a character string in which words and other tokens are separated by commas, and the sentence structure is summarized by "[" and "]". Similarly, the document revision acquisition unit 100 generates character string information for the post-revision document data 210. In this case, the character string information may also be in a form of a character string such as "[Article, 1, (,Application,) 1., The, Terms, shall, apply, to, . . . , Company.]". In this case, the character string information is also generated.

Here, the document revision acquisition unit 100 compares these character string information, converts them into parameters, and generates revision information including the format of the revision part. In the example in FIG. 6, the document revision acquisition unit 100 assumes the format of the revision part to be "sentence (character string)". Further, the document revision acquisition unit 100 may also generate revision information in a format such as "[format, character position, [character string], operation]".

In the example in FIG. 6, in the post-revision document data 210, "2. If the user delays payment of the usage fee, the user shall pay the delay damages at the rate of 14.6% per year." in "Article 4" has been deleted. Therefore, the revised information may be in the form of character string such as "[character string, 928th to 992nd characters, [If, the, user, delays, payment, . . . , year.]Deleted]".

Here, if either or both of the pre-revision document data 200 and the post-revision document data 210 are image data, the document revision acquisition unit 100 may perform OCR the image data to acquire character data, convert them to PDF or other format including transparency characters, or the like, and then perform the above process.

(Step S103)

Then, the relationship acquisition unit 110 performs a relationship acquisition process.

The relationship acquisition unit 110 acquires the relationship information 230 between the reviewee and the reviewer.

The relationship acquisition unit 110 first acquires the user information of the reviewee and the reviewer. At this time, the relationship acquiring unit 110 may acquire the user information of the relationship information 230 based on the data of the document creator, modifier, or reader included in the text or metadata of the pre-revision document data 200 and post-revision document data 210. Among them, the modifier is a user who is a document creator or a user who made the modification. Also, the reader is simply a user who has viewed the document. Here, if the modifier is a user of the terminal 3a, the relationship acquisition unit 110 may set the modifier as a reviewee. On the other hand, if the reader is a user of the terminal 3b, the relationship acquisition unit 110 may set the reader as a reviewer. In addition, the user of the reviewee or the reviewer may directly set the user information.

In addition, the relationship acquisition unit 110 may add the personnel information including belonging department, group, position, or the like, to the user information for the reviewee and the reviewer based on these settings. Specifically, the relationship acquisition unit 110 can also acquire the personnel information from the website of the organization or group to which the user belongs or a file such as a business contact list, or the like. Furthermore, the relationship acquisition unit 110 may acquire the personnel information from each user's account settings and other data.

Then, the relationship acquisition unit 110 may also convert the user information into character string information. In the example in FIG. 6, for example, the user information of the reviewer is "[Mr. A, legal department, general employee]"

Further, the relationship acquisition unit 110 calculates distance between the reviewee's knowledge and the reviewer's knowledge as the relationship distance.

Specifically, for example, the relationship acquisition unit 110 may estimate the knowledge distance between the reviewee and the reviewer from the personnel information in the user information and set this as the relationship distance. For example, in the example in FIG. 6, if the reviewee is an employee in the contract section of the legal department and the reviewer is a manager in the same department, the relationship acquisition unit 110 may determine that the distance in knowledges is close because the distance between departments or groups is close. In contrast, if the reviewer is a researcher in the development department who has no relationship with the legal department, the relationship acquisition unit 110 may determine that the distance in knowledges is distant. On the other hand, if the reviewer is an employee of the intellectual property section of the legal department, the relationship acquisition unit 110 may determine that the knowledge distance is in the middle. The knowledge distance between these departments or groups may be set from an organizational chart on the website, or the like.

Additionally, the relationship acquisition unit 110 may estimate the knowledge distance from the information on the document access distance of the reviewee and the reviewer contained in the relationship information 230 and set this as the relationship distance. For example, the relationship acquisition unit 110 may make the relationship distance closer if the document access distance is closer and make the relationship distance farther if the document access distance is farther.

(Step S104)

Then, the summary generation unit 120 performs a character count calculation process.

The summary generation unit 120 calculates the number of summary characters to adapt for the reviewer. Specifically, the summary generation unit 120 refers to the relationship information 230 and, based on this, calculates the number of summary characters based on the relationship distance between the reviewee and the reviewer. The summary generation unit 120 may, for example, increase the number of summary characters for a larger relationship distance than for a smaller relationship distance. That is, the number of summary characters may be increased for the reviewer who belongs to a different department from the reviewee and has little knowledge of the pre-revision document data 200 and the post-revision document data 210 as prerequisites for the review. In other words, it is for the purpose of descripting the revision part in more detail to the reviewer who has the knowledge distance. On the other hand, for a reviewer who has more knowledge, that is, closer knowledge distance, such as a supervisor in the same department, the number of summary characters may be reduced.

Alternatively, the summary generation unit 120 may set the number of summary characters by acquiring the reviewee's or reviewer's instructions via the UI.

(Step S105)

Then, the summary generation unit 120 performs a summary generation process.

The summary generation unit 120 generates summary data 240 by using the post-revision document data 210, the pre-revision document data 200, the detailed information 220, and the relationship information 230. In the encoder-decoder model according to the present embodiment, the respective character string information, and the like, is input to generate the summary data 240 for the character string.

Further, if there are a plurality of reviewers, the summary generation unit 120 can output a plurality of different summaries based on the detail information 220 and relationship information 230 tailored to each reviewer.

(Step S106)

Then, the summary generation unit 120 determines whether the summary data 240 needs to be modified. The summary generation unit 120 outputs the summary data 240 to the UI of the reviewee's terminal 3a in the chat format similar to the chat output process as described later, and it asks the reviewee if the summary data 240 needs to be revised. If the summary generation unit 120 receives an instruction that revision is necessary as a response, it determines Yes. Otherwise, the summary generation unit 120 determines No.

In the case of Yes, the summary generation unit 120 proceeds to step S107.

In the case of No, the summary generation unit 120 proceeds to step S109.

(Step S107)

If the summary data 240 needs to be revised, the summary generation unit 120 performs a revision process.

Here, the reviewee modifies the summary data 240 in the UI. When this revision is completed, the summary generation unit 120 acquires the modified summary data 240.

(Step S108)

Then, the summary generation unit 120 performs a revised character count reflection process.

The summary generation unit 120 obtains the revised summary data 240 and counts the number of characters. Based on this character count, the summary generation unit 120 changes the number of summary characters in the summary data 240.

Furthermore, based on this modified summary data 240, the summary generation unit 120 may perform feedback learning such as backpropagation to the encoder-decoder model and reflect it in machine learning.

(Step S109)

Here, the chat output unit 130 performs a chat output process.

The chat output unit 130 sends the summary data 240 to the reviewer's terminal 3B by using a chatbot, or the like, and causes it to be output via chat.

FIG. 7 shows an example of the output in chat of the summary data 240 generated based on the revision of the document in FIG. 6. Specifically, it is not just a summary of the revision part, but also a message indicating the contents of the revision, such as character string of "@Mr. B Mr. A has deleted the item related to the penalty for late payment. Please check the linked document. LINK." The "link" at the end of this character string may be embedded with a link tag, and when pressed by the reviewer, the revised document data 210 may be displayed or downloaded.

With the above, the revision content summarization process according to the embodiment of the present disclosure completes.

As configured in this way, the following effects can be obtained.

There exists a typical review application that displays the revision parts of document data with highlighting and strikeout lines. However, in such display method of the typical review application, the reviewer had to check the revision parts of the document data while browsing. Therefore, if the reviewer is not familiar with the contents of the document data, the review takes a long time.

On the other hand, another typical business management apparatus automatically checks and summarizes the revision contents by chapter and section. Therefore, the reviewer has to be aware of the chapter structure of the document. In addition, since the summary can't be made considering the entire document, the relationship between each revision content may not be seen at a glance. Furthermore, it can't handle document data such as presentation materials, for which chapters and sections are difficult to distinguish by machine.

Furthermore, even if a document is summarized by a mere natural language processing AI, since the amount of knowledge that is the premise for the document differs depending on the reviewer, it is often not possible to obtain an appropriate summary for grasping the revision parts.

In contrast, the server 1 according to the embodiment of the present disclosure is a revision content summarizing apparatus including: a document revision acquisition unit 100 that acquires pre-revision document data 200, post-revision document data 210, and detailed information 220 having format of revision part; a relationship acquisition unit 110 that acquires relationship information 230, which is information indicating a relationship between a reviewee, who is a user making the revision, and a reviewer, who is a user reviewing the revised content; and a summary generation unit 120 that generates summary data 240 from the post-revision document data 210, the pre-revision document data 200, and the detailed information 220 acquired by the document revision acquisition unit 100 with the relationship information 230 acquired by the relationship acquisition unit 110; and wherein the summary generation unit 120 determines number of summary characters of the summary data 240 from the relationship distance between the reviewee and the reviewer that is calculated based on the relationship information 230.

By configuring in this way, even in a document where chapters and sections are difficult to distinguish by a computer, it is possible to generate appropriate summary data 240 that makes it easy for the reviewer to grasp the revision part of the document. In other words, it is possible to output the summary data 240 of the revised contents in natural text that takes the entire document into consideration. In addition, the number of summary characters in the summary data 240 can be changed automatically by considering the reviewer's information. Thus, as compared with the typical technology, the review can be performed even if the reviewer does not know the chapter structure of the document. Further, it generates more appropriate summary data 240 than a simple AI for natural language processing, and it presents the reviewer with the revision parts in an easy-to-understand manner. Thus, the reviewer can understand the revision contents without spending time.

This allows the reviewer to proceed with the review more efficiently. As a result, the review time can be shortened, and the reviewee's and the reviewer's workload can be reduced.

Further, the server 1 according to the embodiment of the present disclosure further includes a chat output unit 130 that outputs the summary data 240 to the reviewer in a chat format.

By configuring the server 1 in this way, it is possible to summarize the entire revision contents, display and notify the reviewer in the chat format. In this case, the use of the chat UI for notification makes it easy and efficient to confirm, comment, and notify to a plurality of personnels. This allows for more efficient sharing of revision information.

Further, in the server 1 according to the embodiment of the present disclosure, the summary generation unit 120 increases the number of summary characters when the relationship distance is large as compared to when the relationship distance is small.

By this configuration, a more detailed summary can be generated when the distance between the reviewee's knowledge and the reviewer's knowledge is large as the relationship distance. Therefore, it is possible to generate more appropriate summary data 240 for reviewers with different amounts of prerequisite knowledge.

Further, in the server 1 according to the embodiment of the present disclosure, the summary generation unit 120 changes determination content of the number of summary characters based on revision of the summary data 240 by the user.

By configuring in this way, the actually generated summary data 240 can be made more appropriate to reflect the intentions of the reviewee and the reviewer.

Further, in the server 1 according to the embodiment of the present disclosure, the summary generation unit 120 generates summary data 240 by using an encoder-decoder model with character string information.

By this configuration, more appropriate summary data 240 by using natural language processing can be generated.

Additionally, as input information for machine learning, the pre-revision document data 200, the post-revision document data 210, information on the form of the revision part as the detailed information 220, and the relational information 230 including user information are applied to the encoder-decoder model and learned. As a result, an appropriate model in which the amount and quality of document data are reflected in learning can be created, and this model can be made to generate suitable summary data 240.

OTHER EMBODIMENTS

In addition, the image forming system X according to the embodiment as described above shows an example in which server 1 functions as a revision content summarizing apparatus.

However, it is also possible to install a dedicated application in the image forming apparatus 2 and have it function as a revision content summarizing apparatus.

Figure 8:
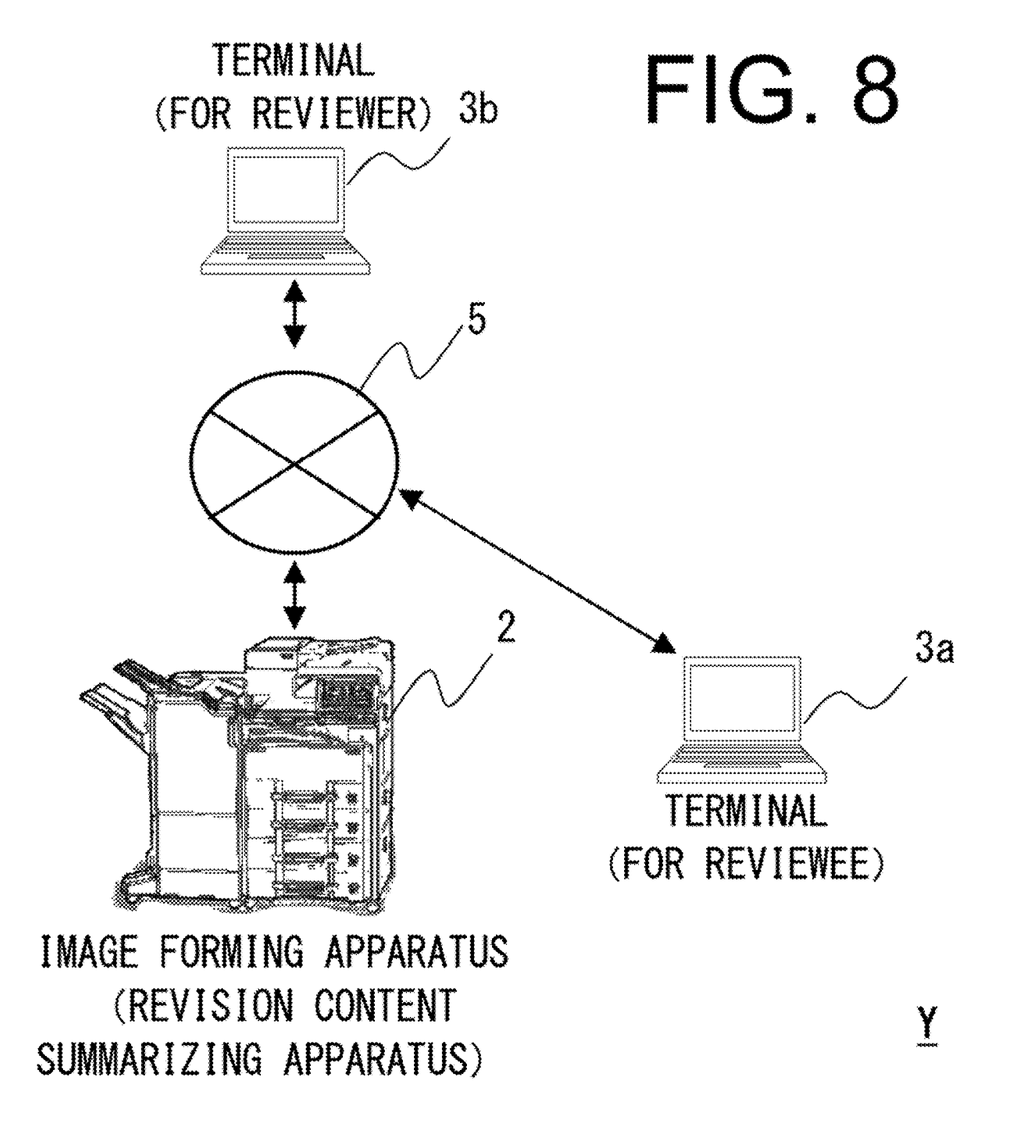
FIG. 8 is a system configuration diagram of an image forming system according to other embodiment of the present disclosure.

FIG. 8 shows a specific example of such an image forming system Y. The image forming apparatus 2 as shown in FIG. 8 may have similar functional configuration as the server 1 as described above.

By configuring in this way, efficient review can be achieved simply by installing the dedicated application on the image forming apparatus such that the document management is performed.

In addition, the dedicated application, or the like, may be installed in the terminal 3a or the terminal 3b to function as a revision content summarizing apparatus in the same manner.

Further, in the embodiment as described above, an example of configuring the summary generation unit 120 locally in the control unit 10 is described.

However, the summary generation unit 120 may be configured to access an external server provided with a large-scale model for natural language processing, such as GPT-3, GPT-4, or the like, by using an API (Application Programming Interface).

Further, in the embodiment as described above, the number of summary characters of the summary data 240 has been calculated by using the knowledge distance between the reviewee and the reviewer as the relationship distance.

However, the number of summary characters may be calculated by calculating the absolute value of the amount of the reviewer's knowledge by using user information, or the like. Specifically, it is also possible to understand the content of the document based on the field of the document and the frequency of occurrence of words in the pre-revision document data 200 and post-revision document data 210, and to calculate the absolute value of the amount of the reviewer's knowledge based on this information. In this case, the content of the document may be compared with the background as the reviewer's history data, or the like, and statistics such as the fields and word frequencies of the documents created by the reviewer with the content of the document by using AI or a statistical model.

By configuring in this way, it is possible to generate more appropriate summary data 240 depending on the field, or the like.

Further, although in the above embodiment, the summary data 240 is outputted in a chat format, it is not limited to this.

Specifically, it is also possible to configure the summary data 240 to be added to the post-revision document data in a comment-like format, output as a separate file, sent by e-mail, sent by facsimile, or read aloud by voice.

By configuring in this way, it is possible to perform reviews that are more suited to the user's environment.

Further, the present disclosure can also be applied to information processing apparatuses other than image forming apparatuses. In other words, it may be configured to use a network scanner, a server separately connected to a scanner via USB, or the like.

Further, in terms used herein, the singular forms "a," "an," and "the" also include the plural forms unless the context clearly indicates otherwise.

Further, it goes without saying that the configuration and operation of the above embodiments are examples, and it may be changed and implemented as appropriate to the extent not departing from the aim of the present disclosure.

What is claimed is:

1. A revision content summarizing apparatus comprising a control unit configured to function as:
    a document revision acquisition unit configured to acquire pre-revision document data, post-revision document data, and detailed information having format of revision part;
    a relationship acquisition unit configured to acquire relationship information, which is information indicating a relationship between a reviewee, who is a user making the revision, and a reviewer, who is a user reviewing the revised content; and
    a summary generation unit configured to generate summary data from the post-revision document data, the pre-revision document data, and the detailed information acquired by the document revision acquisition unit with the relationship information acquired by the relationship acquisition unit; and
    wherein the summary generation unit determines number of summary characters of the summary data from the relationship distance between the reviewee and the reviewer that is calculated based on the relationship information.

2. The revision content summarizing apparatus according to claim 1, further comprising:
    a chat output unit configured to output the summary data to the reviewer in a chat format.

3. The revision content summarizing apparatus according to claim 1, wherein
    the summary generation unit increases the number of summary characters when the relationship distance is large compared to when the relationship distance is small.

4. The revision content summarizing apparatus according to claim 3, wherein
    the summary generation unit changes determination content of the number of summary characters based on revision of the summary data by the user.

5. The revision content summarizing apparatus according to claim 4, wherein
    the summary generation unit generates summary data by using an encoder-decoder model with character string information.

6. An image forming system comprising a control unit configured to function as:
    a document revision acquisition unit configured to acquire pre-revision document data, post-revision document data, and detailed information having format of revision part;
    a relationship acquisition unit configured to acquire relationship information, which is information indicating a relationship between a reviewee, who is a user making the revision, and a reviewer, who is a user reviewing the revised content; and
    a summary generation unit configured to generate summary data from the post-revision document data, the pre-revision document data, and the detailed information acquired by the document revision acquisition unit with the relationship information acquired by the relationship acquisition unit; and
    wherein the summary generation unit determines number of summary characters of the summary data from the relationship distance between the reviewee and the reviewer that is calculated based on the relationship information.

7. The image forming system according to claim 6, further comprising:
    a chat output unit configured to output the summary data to the reviewer in a chat format.

8. The image forming system according to claim 6, wherein
    the summary generation unit increases the number of summary characters when the relationship distance is large compared to when the relationship distance is small.

9. The image forming system according to claim 8, wherein
    the summary generation unit changes determination content of the number of summary characters based on revision of the summary data by the user.

10. The image forming system according to claim 9, wherein
the summary generation unit generates summary data by using an encoder-decoder model with character string information.

11. A revision content summarizing method comprising the steps of:
acquiring pre-revision document data, post-revision document data, and detailed information having format of revision part;
acquiring relationship information, which is information indicating a relationship between a reviewee, who is a user making the revision, and a reviewer, who is a user reviewing the revised content; and
generating summary data from the acquired post-revision document data, the pre-revision document data, and the acquired detailed information with the relationship information; and wherein
determining number of summary characters of the summary data from the relationship distance between the reviewee and the reviewer that is calculated based on the relationship information.

12. The revision content summarizing method according to claim 11, further comprising a step of:
outputting the summary data to the reviewer in a chat format.

13. The revision content summarizing method according to claim 11, wherein
increasing the number of summary characters when the relationship distance is large compared to when the relationship distance is small.

14. The revision content summarizing method according to claim 13, wherein
changing determination content of the number of summary characters based on revision of the summary data by the user.

15. The revision content summarizing method according to claim 14, wherein
generating summary data by using an encoder-decoder model with character string information.

* * * * *